Jan. 4, 1938.                W. F. GROENE                2,104,481
                            CRANKSHAFT CHUCK
                          Filed March 17, 1937
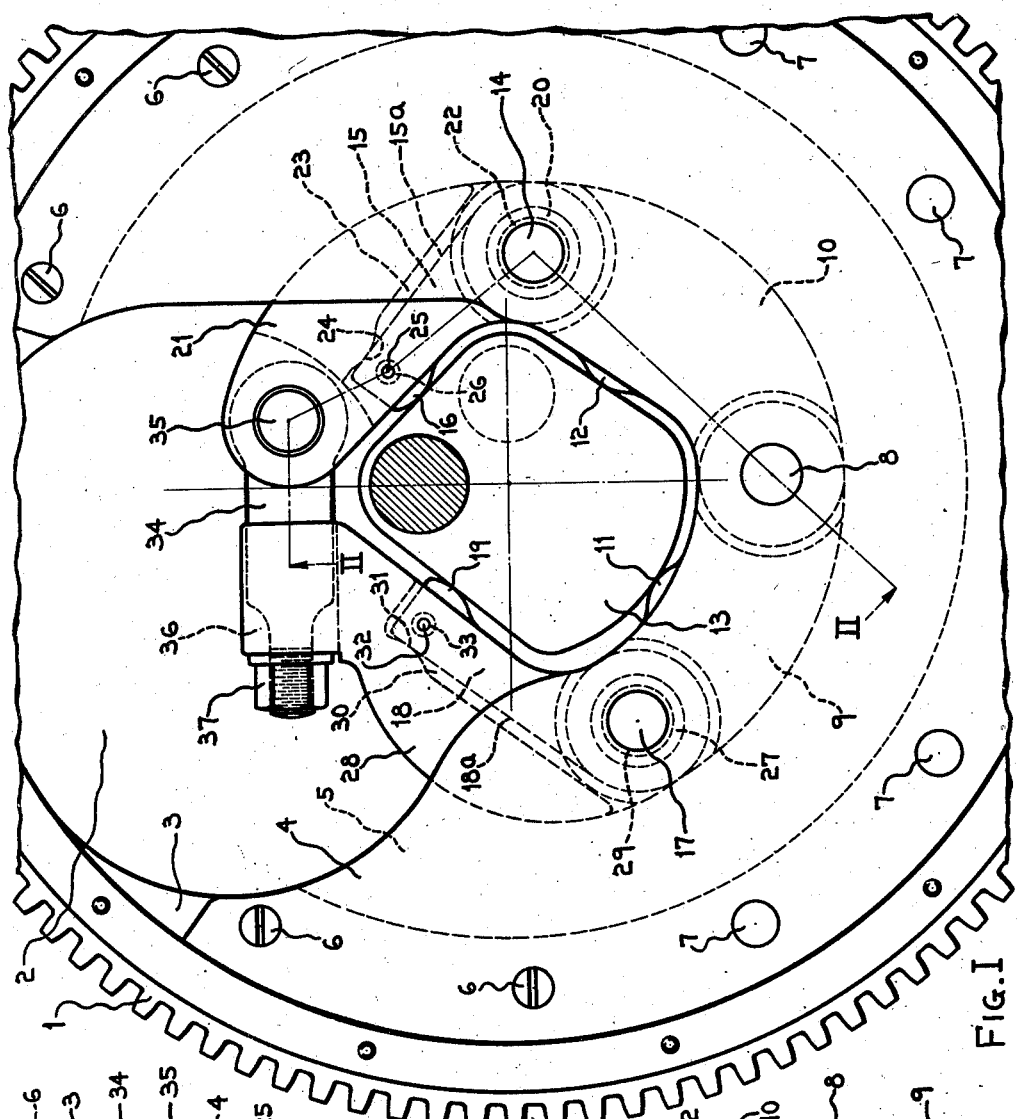
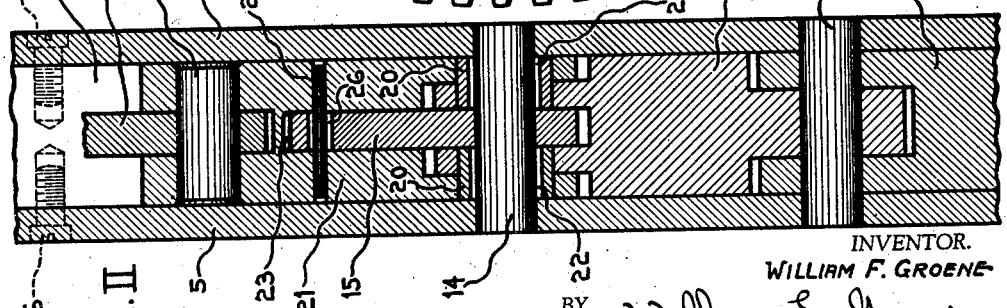
INVENTOR.
WILLIAM F. GROENE
BY Willard L. Groene
ATTORNEY.

Patented Jan. 4, 1938

2,104,481

UNITED STATES PATENT OFFICE 2,104,481

CRANKSHAFT CHUCK

William F. Groene, Cincinnati, Ohio, assignor to The R. K. Le Blond Machine Tool Company, Cincinnati, Ohio, a corporation of Delaware Application March 17, 1937, Serial No. 131,459

16 Claims. (Cl. 82—40)

This invention pertains to chucks for gripping irregular, rough-surfaced work pieces which have been properly prelocated with respect to the axis of rotation of the chuck. More particularly this invention pertains to chucks for gripping the rough surfaces of webs of crankshafts to be chucked and rotated in a crankshaft lathe, for instance, of a character shown in Patent Number 2,069,107 issued January 26, 1937.

An object of my invention is to provide a chuck having a plurality of pivotally mounted jaws which are adapted to engage rough irregular surfaces of a work piece previously centered in a lathe and to securely hold said work piece without distortion in said centered position.

A further object is to provide a chuck having a plurality of pivotally mounted jaws, which are adapted to engage rough irregular surfaces of a work piece previously centered and a single clamping device for moving the jaws to or from the work for loading and unloading and to cause the jaws to securely grip said work.

A still further object is to provide in a chucking device adapted to grip an irregular surface of a work piece to be machined, two pairs of swinging gripping jaws, the jaws of one pair swinging relative to the work piece along a line substantially perpendicular to the line of relative swinging of said other pair.

Another object is to provide in a chucking device having two pairs of opposed swinging clamping jaws a single clamping means for simultaneously bringing said jaws in engagement with the work.

It is also my intention to provide in a chucking device adapted to grip an irregular surface of a work piece to be machined, two pairs of swinging clamping jaws, the jaws of one pair swinging relative to each other along a line substantially perpendicular to the line of relative swinging of said other pair and to provide a clamping means for simultaneously applying all of said jaws to the work, said clamping means being adapted to swing one jaw of each pair away from the work for loading or unloading the work in the chuck.

Further objects will appear from a description of the drawing, in which:—

Figure I is an axial view of the chuck showing the chucking mechanism gripping the irregular, rough periphery of a web of a crankshaft.

Figure II is a section on the line II—II of Figure I.

As an exemplary disclosure, the chucking mechanism is shown applied to a ring gear 1 of a center drive work spindle having an axial bore 2 through which work may be axially loaded into or out of the ring gear 1 manually or by mechanical means, for example, as illustrated in Patent Number 1,700,721 issued January 29, 1929.

To the inner annular rib 3 of the ring gear 1 is fixed the side plates 4 and 5 by suitable screws 6 and dowel pins 7. Pivotally mounted on the pin 8 fixed in the side plates 4 and 5 are the jaws 9 and 10 having the respective projections 11 and 12 adapted to engage the rough, irregular web 13 of a crankshaft. Pivotally mounted on the pin 14 fixed in the side plates 4 and 5 is the jaw 15 having the projection 16 engaging the web 13 in opposed relation to the projection 11 of jaw 9. On the pin 17 fixed in the said plates 4 and 5 is pivotally mounted the jaw 18 (similar to jaw 15) having the projection 19 engaging the web 13 in opposed relation to the projection 12 of the jaw 10.

Hinged to the jaw 10 by bushings 20, Figure II, is the clamping link 21. The bushings 20 surround the pin 14 but have substantial clearance bores 22 which permit sufficient free swinging of the jaw 10 to properly engage its projection 12 with the web 13. The clamping link 21 has a slotted portion 23 which surrounds the jaw 15 in which is an abutment 24 formed integral with the link 21 which engages the surface 15a of the jaw 15 in such a manner as to urge the jaw against the web when the link 21 is swung toward said web. A pin 25 fixed in the link 21 and passing through the clearance hole 26 in the jaw 15 provides means whereby the jaw 15 may be swung away from the web 13, to facilitate loading and unloading work in the chuck, by swinging the link 21 away from the work which also provides ample free movement of the jaw 15 relative to the link 21 to cause proper engagement of the projection 16 with the web 13 when the link 21 is swung toward the work.

Similarly, hinged to the jaw 9 by the bushings 27 is the clamping link 28. The bushings 27 surround the pin 17 but have substantial clearance bores 29 which permit sufficient free swinging of the jaw 9 to properly engage its projection 11 with the web 13. The clamping link 28 has a slotted portion 30, which surrounds the jaw 18, in which is an abutment 31 formed integral with the link 28 which engages the surface 18a of the jaw 18 in such a manner as to urge the jaw against the web when the link 28 is swung toward said web. A pin 32 fixed in the link 28 and passing through the clearance hole 33 in the jaw 18 provides means whereby the jaw 18 may be swung away from the web 13 to facilitate loading and unloading work in the chuck, by swinging the link 28 away from the work while also providing ample free movement of the jaw 18 relative to the link 28 to cause proper engagement of the projection 19 with the web 13 when the link 21 is swung toward the work.

In order to provide means for drawing the links 21 and 28 toward the work to cause the chucking mechanism to grip the work, an eyebolt 34 is pivotally mounted on the pin 35 fixed in the link 21 which may be swung into the slotted portion 36 of the link 28. By tightening the usual nut 37 threaded to the end of the eyebolt 34 the links 21 and 28 can be drawn toward the work causing the jaws 15 and 18 to likewise swing toward and engage the web 13. Further tightening of the nut 37 causes the projections 24 and 31 to slide upwardly along the surfaces 15a and 18a of the respective jaws 15 and 18 which likewise upwardly moves the hinged connections about the bushings 20 and 27 thus swinging the jaws 9 and 10 about the pin 8 to bring the respective projections 11 and 12 in secure engagement with the web 13. Thus all of the clamping jaws 9, 10, 15, and 18 may be simultaneously brought into engagement with the work by tightening the single nut 37.

By loosening the nut 37, swinging the eye-bolt 34 out of the slot 36, and swinging the links 21 and 28 away from the work, easy access to the chuck for loading and unloading is provided.

While I have here illustrated and described one form of my invention it is to be clearly understood that I am not limited to the precise construction or use herein shown, but what I claim as new and desire to secure by United States Letters Patent is:

1. In a chuck adapted to grip and support a precentered work piece without distortion by means of irregular rough surfaces on said work piece, a chuck body, a plurality of pairs of clamping jaws pivotally mounted on said chuck body, the jaws of each pair swinging relative to the work in opposed relation to the jaws of said other pairs, and clamping means to maintain engagement of said jaws with said work piece.

2. In a chuck adapted to grip and support a precentered work piece without distortion by means of irregular rough surfaces on said work piece, a chuck body, a plurality of pairs of clamping jaws pivotally mounted on said chuck body, the jaws of each pair swinging relative to the work in opposed relation to each other, and clamping means to maintain engagement of said jaws with said work piece, said clamping means being adapted to swing some of said jaws of each pair from said work piece to facilitate loading and unloading of said chuck.

3. In a chuck adapted to grip and support a precentered work piece without distortion by means of irregular rough surfaces on said work piece, a chuck body, two pairs of swinging gripping jaws pivotally mounted on said chuck body, the jaws of one pair swinging relative to the work piece along a line substantially perpendicular to the line of relative swinging of the jaws of said other pair, and means to cause said jaws to engage said work piece.

4. In a chuck adapted to grip and support a precentered work piece without distortion by means of irregular rough surfaces on said work piece, a chuck body, two pairs of swinging gripping jaws pivotally mounted on said chuck body, the jaws of one pair swinging relative to the work piece along a line substantially perpendicular to the line of relative swinging of the jaws of said other pair, and clamping means for simultaneously bringing said jaws in engagement with said work piece.

5. In a chuck adapted to grip and support a precentered work piece without distortion by means of irregular rough surfaces on said work piece, a chuck body, two pairs of swinging gripping jaws pivotally mounted on said chuck body, the jaws of one pair swinging relative to the work piece along a line substantially perpendicular to the line of relative swinging of the jaws of said other pair, and clamping means for simultaneously bringing said jaws in engagement with said work piece, said clamping means being adapted to swing one jaw of each of said pairs from said work piece to facilitate loading and unloading of said chuck.

6. In a chuck, a rotatable chuck body, a pair of gripping jaws pivotally mounted to one side of the axis of rotation of said chuck body, said jaws being adapted to swing relative to a work piece in said chuck in directions substantially perpendicular to each other, a gripping jaw pivotally mounted on said chuck body for swinging relative to said work piece in opposed relation to one jaw of said pair of jaws, a gripping jaw pivotally mounted on said chuck body for swinging relative to said work piece in opposed relation to the other jaws of said pair of jaws, and means for swinging all of said jaws to properly engage and support a work piece in said chuck.

7. In a chuck, a rotatable chuck body, a pair of gripping jaws pivotally mounted to one side of the axis of rotation of said chuck body, said jaws being adapted to swing relative to a work piece in said chuck in directions substantially perpendicular to each other, a gripping jaw pivotally mounted on said chuck body for swinging relative to said work piece in opposed relation to one jaw of said pair of jaws, a gripping jaw pivotally mounted on said chuck body for swinging relative to said work piece in opposed relation to the other jaw of said pair of jaws, the axes of pivoting of said pair of jaws and said opposing jaws being so arranged as to define planes substantially perpendicular to each other, and means for swinging all of said jaws to properly engage and support a work piece in said chuck.

8. In a chuck, a rotatable chuck body, a pair of gripping jaws pivotally mounted to one side of the axis of rotation of said chuck body, said jaws being adapted to swing relative to a work piece in said chuck in directions substantially perpendicular to each other, a gripping jaw pivotally mounted on said chuck body for swinging relative to said work piece in opposed relation to one jaw of said pair of jaws, a gripping jaw pivotally mounted on said chuck body for swinging relative to said work piece in opposed relation to the other jaw of said pair of jaws, and means for swinging all of said jaws to properly engage and support a work piece in said chuck, said last mentioned means being also adapted to swing said opposing gripping jaws away from said work piece to facilitate loading and unloading of said chuck.

9. In a crankshaft chuck, a rotatable chuck body, a pair of gripping jaws pivotally mounted substantially about a common axis to one side of the axis of rotation of said chuck body and adapted to be swung toward a crankshaft in said chuck to engage a web thereof from different directions, a second pair of gripping jaws pivotally mounted about different axes each side of the axis of rotation of the chuck body and the axis of pivoting of said first mentioned pair of jaws, each of said second pair of jaws being adapted to be swung toward said crankshaft in opposed relation to one jaw of said first mentioned pair, and clamping means to bring all of said jaws into firm engagement with the web of said crankshaft.

10. In a crankshaft chuck, a rotatable chuck body, a pair of gripping jaws pivotally mounted substantially about a common axis to one side of the axis of rotation of said chuck body and adapted to engage a web thereof from different directions, a second pair of gripping jaws pivotally mounted about different axes each side of the axis of rotation of the chuck body and the axis of pivoting of said first mentioned pair of jaws, each of said second pair of jaws being adapted to be swung toward said crankshaft in opposed relation to a jaw of said first mentioned pair, a pair of clamping links pivotally mounted on said jaws of said first mentioned pair, and clamping mechanism associated with said links whereby operation of said clamping mechanism will cause simultaneous application of all of said jaws to a web of said crankshaft.

11. In a crankshaft chuck, a rotatable chuck body, a pair of gripping jaws pivotally mounted substantially about a common axis to one side of the axis of rotation of said chuck body and adapted to engage a web thereof from different directions, a second pair of gripping jaws pivotally mounted about different axes each side of the axis of rotation of the chuck body and the axis of pivoting of said first mentioned pair of jaws, each of said second pair of jaws being adapted to be swung toward said crankshaft in opposed relation to a jaw of said first mentioned pair, a pair of clamping links pivotally mounted on said jaws of said first mentioned pair substantially on axes coinciding with the axes of pivoting of said second pair of jaws, and clamping mechanism associated with said links whereby operation of said clamping mechanism will cause simultaneous application of all of said jaws to a web of said crankshaft.

12. In a crankshaft chuck, a rotatable chuck body, a pair of gripping jaws pivotally mounted substantially about a common axis to one side of the axis of rotation of said chuck body and having free swinging motion to engage a web of a crankshaft in said chuck from different directions, a second pair of gripping jaws pivotally mounted about different axes each side of the axis of rotation of the chuck body and the axis of pivoting of said first mentioned pair of jaws, each of said second pair of jaws being adapted to be swung toward said crankshaft in opposed relation to a jaw of said first mentioned pair, a pair of clamping links pivotally mounted on the jaws of said first mentioned pair substantially on axes coinciding with the axes of pivoting of said second pair of jaws to thereby limit the extent of swinging of the jaws of said first mentioned pair of jaws, and clamping mechanism associated with said links whereby operation of said clamping mechanism will cause simultaneous application of all of said jaws to a web of said crankshaft.

13. In a crankshaft chuck, a rotatable chuck body, a pair of gripping jaws pivotally mounted substantially about a common axis to one side of the axis of rotation of said chuck body and having free swinging motion to engage a web of a crankshaft in said chuck from different directions, a second pair of gripping jaws pivotally mounted about different axes each side of the axis of rotation of the chuck body and the axis of pivoting of said first mentioned pair of jaws, each of said second pair of jaws being adapted to be swung toward said crankshaft in opposed relation to a jaw of said first mentioned pair, a pair of clamping links pivotally mounted on the jaws of said first mentioned pair substantially on axes coinciding with the axes of pivoting of said second pair of jaws, means on said links to engage said second pair of jaws to urge them toward said crankshaft, and clamping means associated with said links whereby operation of said clamping means will cause simultaneous application of all of said jaws to a web of said crankshaft.

14. In a crankshaft chuck, a rotatable chuck body, a pair of gripping jaws pivotally mounted substantially about a common axis to one side of the axis of rotation of said chuck body and having free swinging motion to engage a web of a crankshaft in said chuck from different directions, a second pair of gripping jaws pivotally mounted about different axes each side of the axis of rotation of the chuck body and the axis of pivoting of said first mentioned pair of jaws, each of said second pair of jaws being adapted to be swung toward said crankshaft in opposed relation to a jaw of said first mentioned pair, a pair of clamping links pivotally mounted on the jaws of said first mentioned pair substantially on axes coinciding with the axes of pivoting of said second pair of jaws, means on said links to engage said second pair of jaws to urge them toward said crankshaft, means associated with said links for retracting the jaws of said second pair from the web of said crankshaft, said last mentioned means providing limited relative movement between said jaws of said pair and said links, and clamping means associated with said links whereby operation of said clamping means will cause simultaneous application of all of said jaws to a web of said chrankshaft.

15. In a chuck adapted to grip and support a precentered work piece without distortion by means of irregular rough surfaces on said work piece, a chuck body, a plurality of pairs of clamping jaws pivotally mounted on said chuck body, the jaws of each pair swinging relative to the work in opposed relation to each other, and clamping means carried by said jaws to maintain engagement of said jaws with said work piece.

16. In a chuck adapted to grip and support a precentered work piece without distortion by means of irregular rough surfaces on said work piece, a chuck body, a plurality of pairs of clamping jaws pivotally mounted on said chuck body, the jaws of each pair swinging relative to the work in opposed relation to each other, and clamping means by one jaw of each pair to maintain engagement of said jaws with said work piece.

WILLIAM F. GROENE.